United States Patent
Reynolds (10) Patent No.: US 6,483,682 B1
(45) Date of Patent: Nov. 19, 2002

(54) ELECTRIC POWER DISTRIBUTION SYSTEM EMPLOYING A FIGHT-THROUGH SWITCH

(75) Inventor: John C. Reynolds, Hanover, PA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/886,433

(22) Filed: Jun. 21, 2001

(51) Int. Cl.[7] .............................. H02H 3/00; H02H 5/00
(52) U.S. Cl. ....................................................... 361/63
(58) Field of Search .............................. 361/59, 61, 63, 361/65, 67

(56) References Cited

U.S. PATENT DOCUMENTS

| | | | |
|---|---|---|---|
| 4,707,618 A | * | 11/1987 | Hans |
| 5,295,258 A | * | 3/1994 | Jewett et al. |
| 5,357,419 A | * | 10/1994 | Limpaecher |
| 5,579,197 A | * | 11/1996 | Mengelt et al. |

* cited by examiner

*Primary Examiner*—Edward H. Tso
(74) *Attorney, Agent, or Firm*—Birch, Stewart, Kolasch & Birch, LLP (57) ABSTRACT

An electrical power distribution system and automatic bus transfer switch therefor, consisting of two pairs of insulated gate bipolar transistors (IGBTs) connected in series in a back-to-back circuit configuration with respective semiconductor diodes connected across the current conducting terminals thereof so as to provide a static AC switch configuration which implements a fight-through bus transfer switch wherein only one pair of switches is rendered conductive at any one time, wherein one transistor and a diode across the other transistor of the same pair conduct in each half cycle of the AC power waveform, and thus provide power to one or more load(s) from either of two AC sources, a primary AC source or an alternate AC source.

40 Claims, 4 Drawing Sheets

ELECTRIC POWER DISTRIBUTION SYSTEM EMPLOYING A FIGHT-THROUGH SWITCH

BACKGROUND OF THE INVENTION

1. Field of the Invention

This invention relates to electric power distribution systems and more particularly to an electric power distribution system which can be rapidly reconfigured in real time to provide uninterrupted power to certain load(s) under variable operating conditions.

2. Description of the Related Art

Continuous availability of electric power is necessary in a variety of environments, one of which is in naval vessels such as ships in the current fleet of the U.S. Navy, and in future all electric ships. Uninterruptible power enables uninterruptible war fighting capability and enhanced survivability by providing reliable power to all loads under all conditions, even in the presence of significant battle damage or major system faults. Such an electrical distribution system employs a source of AC power which is fed to the load(s) through a combination of circuit breakers, current limiting devices and bus transfer switches.

SUMMARY

Accordingly, it is an object of the present invention to provide an improvement in electrical power distribution systems.

It is a further object of the invention to provide an improvement in electrical distribution systems which can be rapidly reconfigured on demand to provide substantially uninterrupted power.

And it is yet another object of the invention to provide an improved electrical distribution system employing solid state technology for implementing a bus transfer switch so as to provide uninterrupted power of all loads, particularly critical loads such as computers, under adverse operating conditions.

These and other objects are achieved by an electrical power distribution system including an automatic bus transfer switch, consisting of two sets of insulated gate bipolar transistor (IGBTs) connected in series in a back-to-back circuit configuration with respective intrinsic semiconductor diodes that are internal to the device in parallel with the current conducting terminals thereof so as to provide a static AC switch configuration which implements a fight-through bus transfer switch wherein only one set of switches is turned on at any one time and thus provide power to one or more load(s) from either of a primary or an alternate AC source and wherein one transistor and a diode across the other transistor conduct in each half cycle of the AC power waveform.

Further scope of applicability of the present invention will become apparent from the detailed description provided hereinafter. It should be understood, however, that the detailed description and specific example, while providing the preferred embodiment of the invention, is provided by way of illustration only, thus various changes and modifications coming within the spirit and scope of the invention will become apparent to those skilled in the art from the following detailed description.

DESCRIPTION OF THE DRAWINGS

The present invention will become more fully understood when the detailed description is considered in conjunction with the accompanying drawings which are provided for purposes of illustration only, and thus are not meant to be considered in a limiting sense, and wherein.

DETAILED DESCRIPTION OF THE INVENTION

Continuous availability of electric power is fundamental to achieving enhanced fighting capability in the U.S. Navy today and in the future, particularly with respect to all-electric ships. This invention describes an advanced electrical distribution system employing an enabling semiconductor circuit configuration referred to as a "fight-through switch" (FTS) which permits the electrical distribution system to rapidly reconfigure itself in real time to provide uninterrupted power under adverse operating conditions. Uninterruptible power enables uninterruptible warfare capability and enhanced survivability by providing reliable power to all loads under all conditions, even in the presence of significant battle damage or major system faults. The present invention enables pre-hit reconfiguration by providing an electrical distribution system with the capability of automatically reconfiguring itself prior to weapon impact to minimize the effects of battle damage. It furthermore reduces life cycle costs because it combines the functions of current limiting and automatic bus transfer switching used in current shipboard 400 Hz power systems into a single unit thereby reducing the amount of equipment required while also eliminating chronic maintenance operations associated with current limiting devices and mechanical automatic bus transfer switches.

Figure 1:
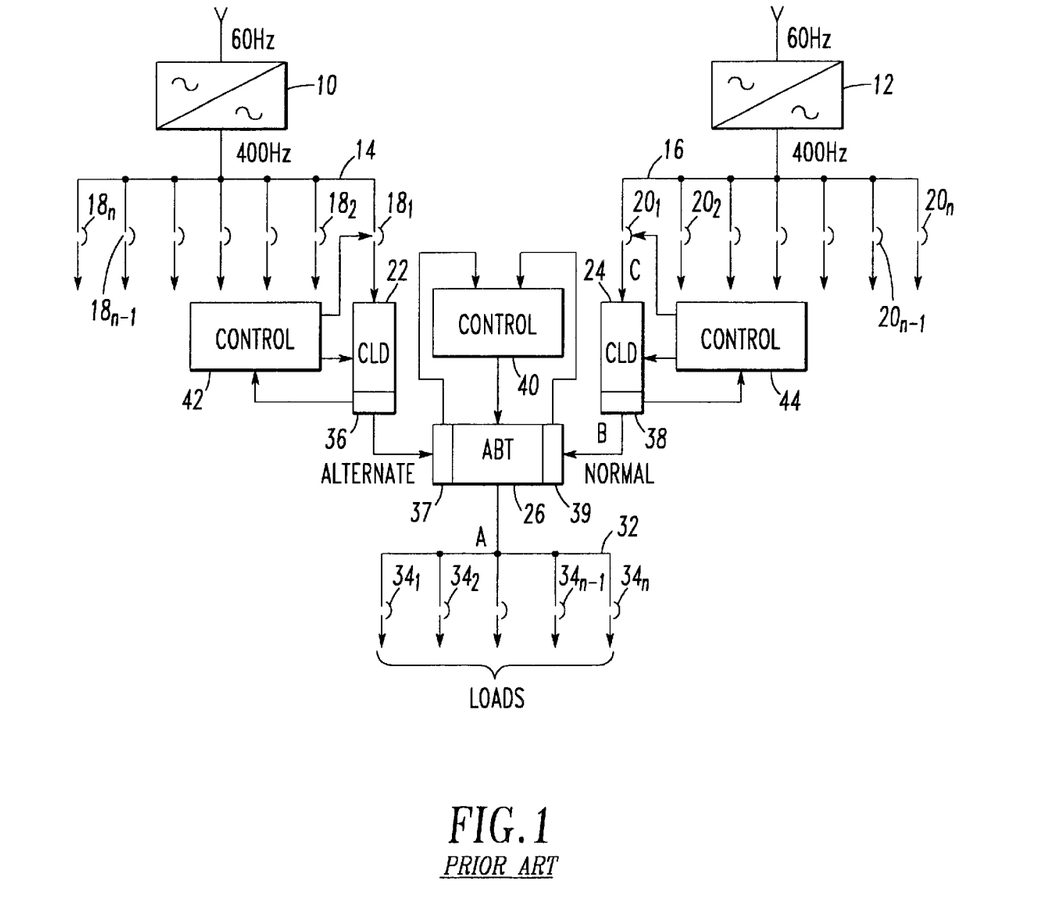
FIG. 1 is an electrical block diagram illustrative of an electrical power distribution system in accordance with the known prior art.

Referring now to the drawings and more particularly to FIG. 1, shown thereat is a simplified electrical block diagram of a conventional 400 Hz power system currently in use, for example, on certain types of naval vessels. The major components include: a static frequency changer (SFC), 400 Hz switchboard (SWBD) with installed circuit breakers, current limiting device (CLD), and automatic bus transfer (ABT) switch. The objective of the distribution system is to provide quality power to the critical loads at all times during all situations.

As shown, the system comprises a redundant power distribution system including two static frequency changers (SFCs) 10 and 12 which convert 60 Hz input power to 400 Hz power at a nominal value of 450 V. The 400 Hz power from the static frequency changers is fed to two separate switchboards (SWBDs) 14 and 16 which include respective sets of circuit breakers $18_1$, $18_2$, ... $18_{n-1}$, $18_n$ and $20_1$, $20_2$, ... $20_{n-1}$, $20_n$ which feed power to a plurality of loads, not shown. Each circuit breaker, for example, circuit breaker $18_1$ and $20_1$ connect to respective current limiting devices (CLDs) 22 and 24 which in turn are connected to a common automatic bus transfer (ABT) switch 26.

The switchboards 14 and 16 and circuit breakers $18_1$ ... $18_n$ and $20_1$ ... $20_n$ installed thereon distribute the power to groups of loads throughout a ship, for example. The circuit breakers are conventional AQB types with thermal-magnetic trip units and shunt trip coils. In case of a current fault, the trip unit senses the fault current and, when certain trip conditions have been achieved, opens the mechanical contacts of the circuit breaker, which interrupts the fault current. A key operating feature is that fault current must exist for a relatively long period of time for a conventional circuit break to trip and remove the fault from the bus. Typically, fault current with a magnitude of four to eight times the rated current is required to trip an AQB circuit breaker on its inverse time setting. Fault current results from a short circuit which can damage an SFC. To prevent damage, the SFC such as SFCs 10 and 12, upon detection of a short circuit protects itself by limiting its output current through a reduction in its output voltage.

The CLD is a protection device which functions to limit the current, in the event of a fault on its load side, to a value such that the static frequency changer does not go into the current limit mode, thus maintaining the bus voltage to the other loads.

The ABT switch 26 is connected to a power panel (PWR PNL) 32 which also includes a set of circuit breakers $34_1$, $34_2$, ... $34_n$ which also feed power to multiple loads. Sensors 36 and 38 comprising simple current and voltage sensors are located within CLDs 22 and 24. Sensors 37 and 39 are located within ABT 26. The automatic bus transfer switch (ABT) 26 is operated in response to a control circuit 40 which is responsive to signals from sensors 37 and 39. Control circuits 42 and 44 associated with CLDs 22 and 24 operate in response to signals from sensors 38 and 36. Fault detection occurs inside the controllers 40, 42 and 44 through software processing of the current and voltage data fed thereto from the sensors 36, 37, 38 and 39.

Figure 2:
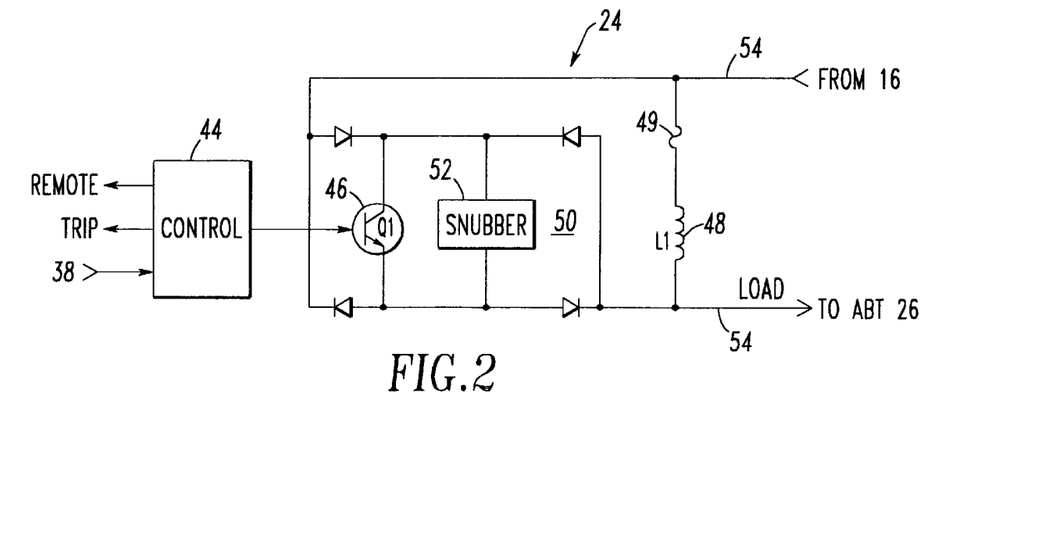
FIG. 2 is an electrical schematic diagram illustrative of the current limiting device (CLD) included in the prior art system shown in FIG. 1.

Both current limiting devices (CLDs) 22 and 24 shown in FIG. 1 are identical in configuration, one of which, CLD 24, is shown in FIG. 2. The major components of CLD 24 include a fast acting electronic switch shown as a bipolar Q1 transistor 46, a current limiting L1 inductor 48, a diode bridge 50, a snubber 52, and a controller already referred to by reference numeral 44 in FIG. 1.

During normal operation, the Q1 transistor 46 is conductive (ON) and the majority of the current flows continuously from the line 54 to the ABT 26 through the diode bridge 50 and Q1 transistor 46 in a well known manner. A small amount of current flows through L1 inductor 48. Two of the four diodes in the bridge 50 are always in the conduction path through the Q1 transistor 46.

When the controller 44 senses a fault via the sensor 38, Q1 transistor 46 is switched to a non-conductive state (OFF), forcing the entire fault current to flow through L1 inductor 48 and a fuse 49. The impedance of L1 is selected such that, for a bolted line- to-line fault, the SFC 12 does not go into current limit operation, while sufficient fault current exists to cause the current breaker to trip.

Figure 3A:
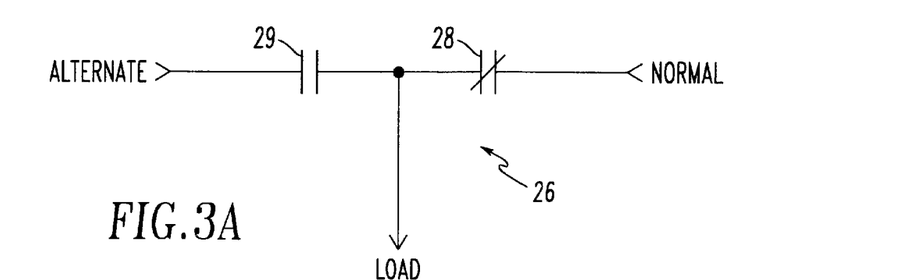
FIGS. 3A and 3B are illustrative of two examples of switches utilized in connection with the automatic bus transfer (ABT) switch shown in FIG. 1.
Figure 3B:
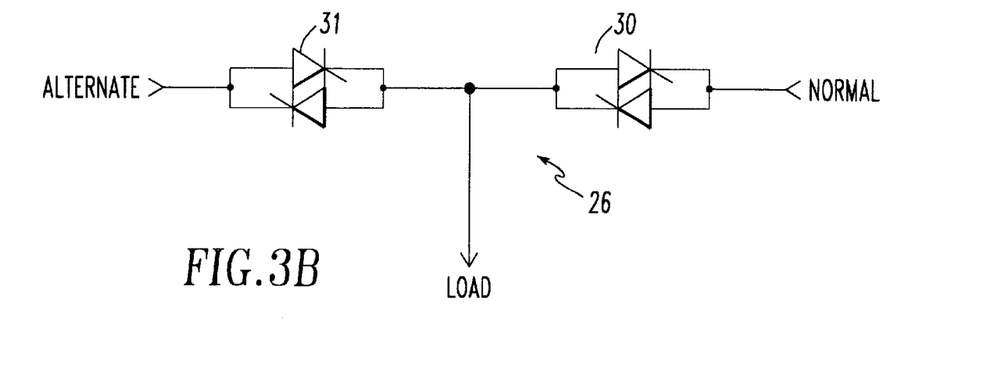

The automatic bus transfer (ABT) switch 26 normally consists of two interlocked electromechanical sets of switch contacts 28 and 29 as shown in FIG. 3A which operates in response to a controller, for example the controller 40 shown in FIG. 1. Alternatively, the ABT switch 26 may be comprised of two pairs of mutually oppositely poled controlled rectifiers 30 and 31, such as silicon controlled rectifiers (SCRs), which are connected in parallel as shown in FIG. 3B and comprise electronic equivalents of the switch contacts 28 and 29 shown in FIG. 3A.

The ABT function is to provide power continuity to the loads, not shown, connected to the circuit breakers $34_1$ ... $34_n$ in the power panel (PWR PNL) 32 in the event of loss of a normal supply voltage provided by SFC 12. It monitors the supply voltage from SFC 12 and when the supply voltage is outside acceptable limits, as sensed by sensor 39, the ABT controller 40 initiates a transfer to the alternate power source SFC 10 by opening the normally closed switch contacts 28 and closing the alternate supply switch contacts 29. Since it is a break-before-make mechanical switch configuration, power to the load is temporarily interrupted during the transfer interval, typically over 100 milliseconds.

Figure 4A:
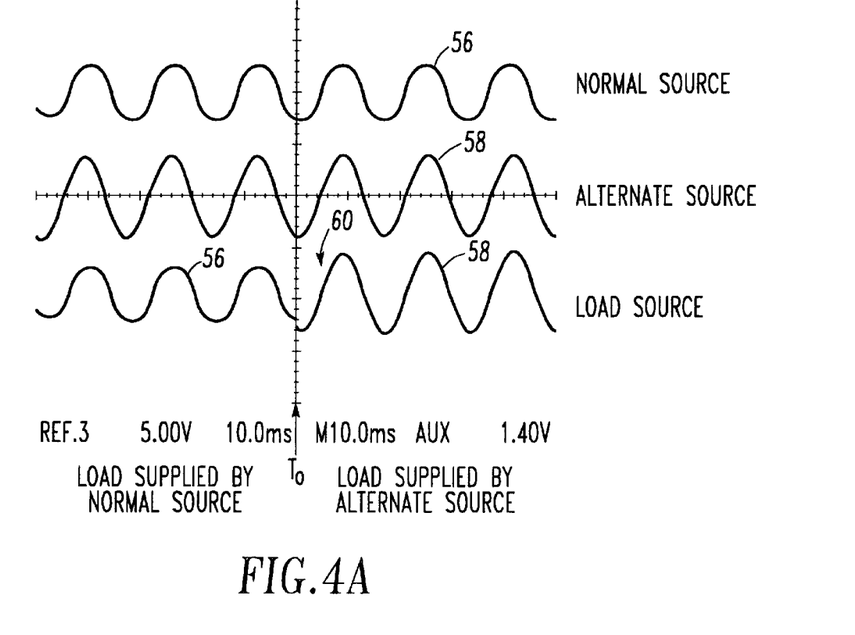
FIGS. 4A and 4B depict two sets of voltage and current waveforms which are illustrative of substantially uninterrupted electrical power supplied to a load from two separate sources.
Figure 4B:
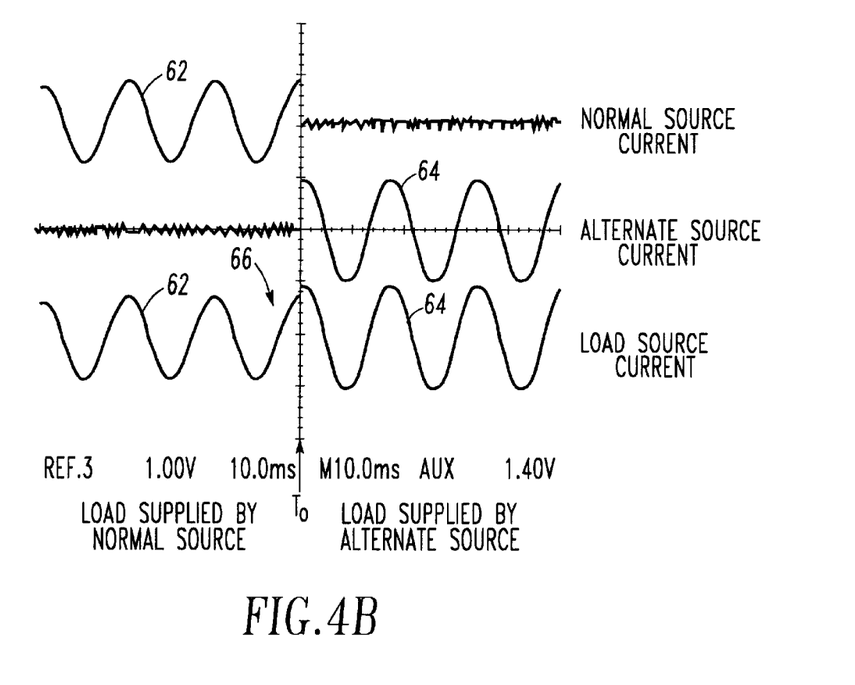

The switching action of an ABT implemented with SCRs is much faster than a mechanical switch, with switching times on the order of 10–20 milliseconds. Such operation is shown by the voltage and current waveforms shown in FIGS. 4A and 4B, where, for example, reference numerals 56 and 58 denote the supply voltages from SFC 12 and SFC 10, respectively. While these waveforms result from a 3∅ system, only 1∅ is depicted for the sake of simplicity. It can be seen by reference numeral 60 that voltage waveform 56 is supplied to the load from SFC 12 under normal conditions, but at $T_o$ voltage waveform 58 is supplied to the load from the alternate source SFC 10. This is further illustrated by the current waveforms in FIG. 4B where, for example, current waveform 62 is indicative of the current supplied by SFC 12, while current waveform 64 is indicative of the current supplied by SFC 10 and reference numeral 66 indicates the current waveform 62 being fed first to the load and then as being supplied by current waveform 64 at $T_o$.

It should be noted that the circuitry shown in FIG. 1 is repeated for each of the circuit breakers $18_2$ ... $18_n$ and $20_2$ ... $20_n$ SO as to feed all of the loads being fed by the power distribution system.

Considering the operation of the system shown in FIG. 1 in further detail, when a load fault occurs at point A, current through the ABT 26 and CLD 24 begins to increase. As the fault current increases, the supply voltage at point A decreases. When the current rises to the trigger threshold in the CLD 24 as sensed by the sensor 38, the controller 44 turns the Q1 transistor OFF, thereby changing the CLD to its high impedance state. The voltage output of the SFC 12 can then remain high enough to contribute power to the other loads on its output bus. Total response time, measured from fault detection to impedance insertion, is typically microseconds. The fault current is allowed to flow, for example, for a maximum of 150 milliseconds. If the circuit breaker $20_1$ does not trip within this time interval, the CLD controller 44 couples the signal to trip the circuit breaker 201. During the interval that the fault current exists, SFC 12 supplies the fault current in addition to its normal load current, creating a disturbance on the system supply voltage. The disturbance due to the fault affects all of the loads connected to the SFC 12 via circuit breakers $20_1$ ... $20_n$. Since the fault is on the load side of ABT 26, the fault effectively disables all loads supplied by ABT 26.

When a fault occurs at point B in FIG. 1, CLD 24 and SFC 12 respond as described above. In this instance, however, since the fault is between the CLD 24 and ABT 26 on the "normal" supply side to the load, the ABT 26 initiates a transfer to the "alternate" supply SFC 10 when the normal supply voltage decreases to the transfer threshold. However, power to all loads serviced by the ABT 26 is disrupted during the transfer interval, which may be 100 milliseconds or more in duration. At the end of the transfer interval, load power is restored via SFC 10. Given the relatively long transfer duration, many loads must effectively restart, for example, computers must reload, leading to a substantial loss of combat capability until all systems are back on line. To compensate for this undesirable characteristic of the system, uninterruptible power supplies (UPS) are sometimes inserted between ABT 26 and the critical load.

When the fault occurs at point C, ABT 26 responds as described above, with the associated power disruption. Since the fault occurs upstream of CLD 24, it cannot limit the current. Fault current continues to increase either SFC 12 goes into current limit operation, or circuit breaker $20_1$ trips and interrupts the fault current, with the fault current limit operation being the most likely scenario. Thus the voltage collapses and power is effectively interrupted to all loads supplied by the faulted switchboard, i.e., SWBD 16, causing the load supplied by the respective ABTs to transfer to the alternate source SFC 10.

The underlying causes of the failures of the system shown in FIG. 1 to provide power continuity is the slow circuit breaker response time coupled with a time delay inherent in the ABT 26 where mechanical switch contacts are present, such as shown in FIG. 3A.

While system response can be improved in the event of loss of normal supply voltage source SFC 12, the solid state ABT switch consisting of oppositely poled parallel pairs of silicon-controlled rectifiers (SCRs) 30 and 31 as shown in FIG. 3B, while it improves the load power continuity, it does not address the fundamental fault current correct issues. Since the SCR is a line-commutated device, current limiting devices 22 and 24 shown in FIG. 1 are still required to limit the fault current until the circuit breaker clears the fault. Additionally, the heat dissipated in SCRs decrease the overall system efficiency.

Figure 5:
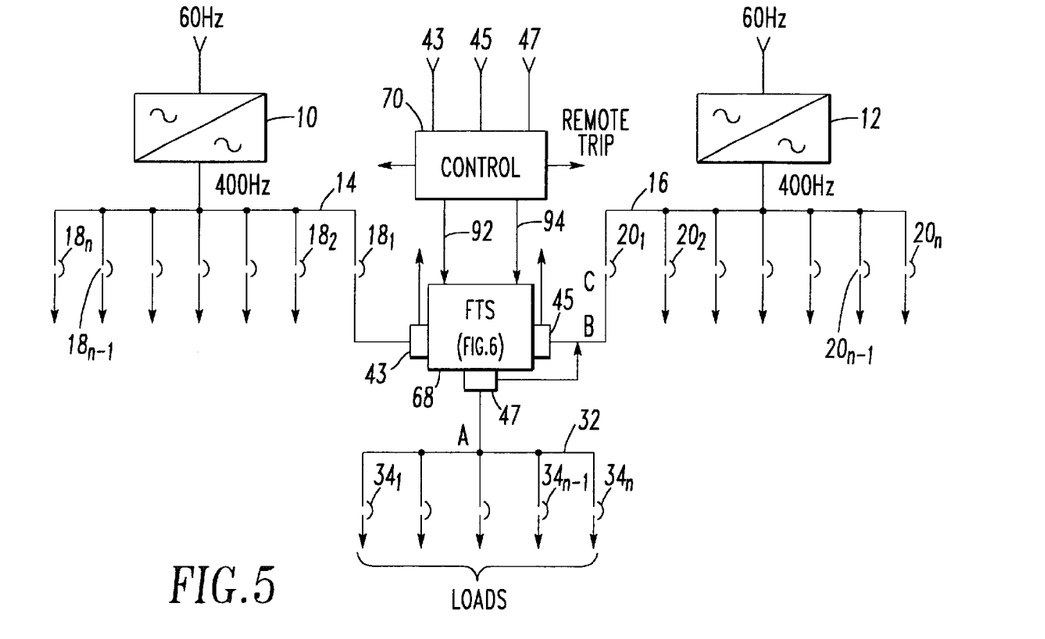
FIG. 5 is an electrical block diagram of an electrical power distribution system in accordance with the preferred embodiment of the present invention.
Figure 6:
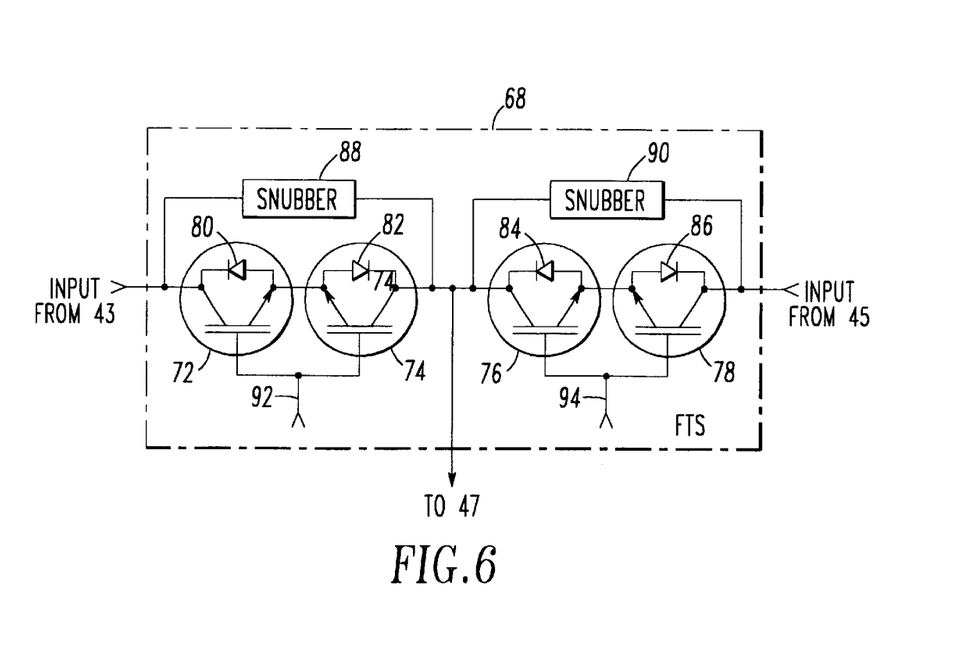
FIG. 6 is an electrical schematic diagram illustrative of the preferred embodiment of a solid state bus transfer switch, termed a "fight-through switch" (FTS) used in connection with the system shown in FIG. 5.

The inherent limitations of prior art power distribution systems shown in FIG. 1 employing an automatic bus transfer switch (ABT) shown in either FIGS. 3A or 3B, is overcome in the present invention by a solid state bus transfer switch configuration termed a "fight-through-switch" (FTS) 68 shown in FIG. 5, the details of which are shown in FIG. 6. The FTS 68 is controlled by a controller 70 responsive to faults detected by means of sensors 43 and 45 located on the input lines 19 and 21 from the circuit breakers $18_1$ and $20_1$ and a sensor 47 located on the output lines 33 to the power panel 32 including the load circuit breakers $34_1 \ldots 34_n$.

FTS 68 consists of two sets of back-to-back series connected solid state switch devices such as, but not limited to, insulated gate bipolar transistors (IGBTs) 72, 74 and 76, 78 having intrinsic diodes 80, 82 and 84, 86 that are internal to the devices and connected across respective drain and source electrodes thereof and result in the diodes being oppositely poled in a back-to-back transistor configuration. A typical example of such an IGBT is a CM 1000 HA-24 H device rated at 1000 amp./1200 volts.

When desirable, metal oxide semiconductor field effect transistors (MOSFETs) or other suitable solid state devices could be utilized. Snubbers 88 and 90 are respectively coupled across the pairs of IGBTs 72, 74 and 76, 78 as shown. Further as shown in FIG. 6, SFC 12 is connected to one side of IGBT pair 76 and 78, while SFC 10 is connected to one side of IGBT pair 72 and 74. The opposite side of the pairs of IGBTs 72, 74 and 76, 78 are commonly connected to circuit junction 92 which connects to the power panel 32 shown in FIG. 5. The gate electrodes of IGBT transistors 72 and 74 are commonly coupled together to the controller 70 by means of circuit lead 92. In a like fashion, the gate electrodes of IGBT transistors 76 and 78 are commonly connected to the controller 70 via circuit lead 94.

In the circuit configuration shown in FIG. 6, only one set of IGBT switches is turned on at any one time, providing power to the load from either SFC 12 or SFC 10. One transistor of each pair and the diode across the other transistor of the pair conduct on opposite half cycles of the AC waveform. Thus, when a transfer operation is initiated due to loss of 400 Hz power, the conducting switch set consisting of transistors 76 and 78 are turned OFF and switch set consisting of transistors 72 and 74 is turned ON. Since switch commutation is forced with very fast switching times, typically 500 nanoseconds, there is no perceptible interruption of power to its respective load.

The architecture of the FTS 68 is similar to the solid state ABT show in FIG. 3B, with the exception of two major differences. First, the FTS 68 uses transistors to function as relatively fast transfer switches, whereas the solid state ABT of FIG. 3B utilizes relatively slow controlled rectifiers. FTS switching times in less than one microsecond have been observed. Secondly, the FTS 68 is controlled by a known Universal Digital Controller, an example of which comprises Northrop Grumman Part No. 20500F23 and which has a relatively high speed bus transfer capability, thus eliminating the need for the protective current limiting functions of the CLDs 22 and 24 shown in FIG. 1. Its main components are a digital signal processor, voltage and current instrumentation, a LAN interface, and a local display interface.

Referring again to FIG. 5, the points A, B and C, as previously noted, are potential fault locations. Points B and C appear to be at the same point electrically, however, they are located at different locations on, for example, the ship and separated, for example, by a distribution cable 21. Again, the objective of the distribution system as shown in FIG. 5 is to provide quality power to all critical loads at all times during all situations, except to a faulted load.

Considering the operation of FIG. 5, when a load fault occurs at point A, current through the FTS 68 begins to increase. When the current rises to the trigger threshold in FTS 68, the controller 70 turns OFF transistors 76 and 78, thereby disconnecting the faulted load from the distribution system.

As in the prior art system shown in FIG. 1, SFC 12 supplies the fault current in addition to its normal load current. However, the resulting disturbance with the FTS 68 is much less severe since the magnitude of fault current is much lower and the duration of the fault is much shorter when compared to that of FIG. 1. Total system response time, from fault inception to system restoration, is in the order of approximately 125 microseconds.

When a fault occurs at points B or C, the FTS 68 initiates transfer to the alternate supply SFC 10 when the normal supply voltage decreases to the transfer threshold. Power to all loads serviced by this switch is interrupted during the transfer interval, but given the short transfer duration, power continuity is effectively maintained to all loads. The only difference between points B and C is the impedance of the distribution system. If the impedance is low, as probably is the case, the bus voltage would decrease before a circuit breaker, for example circuit breaker $20_1$ can clear the fault. Since all of the vital loads fed from the switchboard 16 are also supplied by FTS 12, they will also switch to the alternate supply SFC 10 when the drop in voltage is detected. Thus, uninterrupted power is maintained to the system even though the CLD function (FIG. 1) has been removed due to the speed of operation of the IGBT transistors 72, 74 and 76, 78.

The above described scenario assumes that the remaining on-line capability can supply all vital loads. If this is not the case, vital loads can be prioritized to sequentially transfer until the bus capacity has been fully utilized, even though the SFC connected may be forced into an overload condition. Then, when the circuit breaker clears the fault in the other bus, the loads will be transferred back to their normal supply. If the fault does not clear, the FTS can implement a real time load shed function as appropriate for the situation to maintain power to all vital loads.

The FTS 68 could also be configured such that both sets of switches 72, 74 and 76, 78 are normally ON, with one switch set designated as "normal" and the other set designated as "alternate". In this configuration, the load would be supplied from both inputs in a current sharing relationship. Assuming that the sources are synchronous but not necessarily paralleled at the switchboards 14 and 16, the two sources 12 and 10 would be in parallel at each FTS, effectively providing source auctioneering in an AC distribution system. In the event of a supply fault or loss of source, or if the sources 10 and 12 become asynchronous, the switch set on that leg would be turned OFF, effectively isolating that input from the load. Load current would continue to be supplied from the available sources 12 or 10. This scheme would virtually eliminate switching transients during bus transfer operations. In the event of a load fault, both sets of switches 72, 74 and 76, 78 would be turned OFF to isolate the fault from the rest of the distribution system.

The FTS 68 can be interconnected, when desirable, via a data network with a work station, not shown, to form a power management system. Each FTS 68 used in connection with the other circuit breakers of the system, each are normally configured for independent operation; however, remote control of the FTSs may be implemented via a LAN interface. The state of each FTS 68 could be a second window on a display, with the overall summary view being provided. Using the X-windows or equivalent display technology, the display be called up on any work station aboard the vessel or remotely by the in-service engineering agent via a satellite link. Furthermore, data relating to load current and power characteristics can be exploited in support of a condition-based maintenance strategy. Real time waveform analysis could also be implemented to support insipient detection of ground or line-to-line faults. Since each FTS 68 can provide complete instrumentation for voltage and current as to its node in the distribution system, the capability of real time power flow analysis can be provided.

The foregoing detailed description merely illustrates the principles of the invention. It will thus be appreciated that those skilled in the art will be able to devise various arrangements which, although not explicitly described or shown herein, embody the principles of the invention, and are thus within its spirit and scope.

What is claimed is:

1. A redundant electric power distribution system for providing reliable power to one or more loads in the event of a fault, comprising:

a first and a second source of AC power for supplying power to at least one AC load, the first source being a normally used source and the second source being an alternately used source;

a bus transfer switch circuit consisting of at least two pairs of series connected solid state switch devices, one of said pair of switch devices connecting the first source of AC power to the load in absence of a line fault, and the other of said pair of switch devices connecting the second source of AC power to the load in the event of a line fault.

2. A power distribution system according to claim 1 wherein each pair of said pair of solid state switch devices include semiconductor switch devices connected in back-to-back circuit relationship between said load and one of said first and second AC power sources.

3. A power distribution system according to claim 2 wherein each of said semiconductor switch devices include a current control terminal and first and second current conducting terminals, and wherein the current conducting terminals of each said pair of semiconductor switch devices are connected in series and the current control terminals thereof are connected in parallel.

4. A power distribution system according to claim 3 and including a pair of mutually oppositely poled unidirectional current conducting semiconductor devices respectively connected across the first and second current conducting electrodes of each said pair of semiconductor switch devices so that one semiconductor switch device of said pair and a unidirectional current conducting semiconductor device across the current conducting electrodes of the other semiconductor switch device of said pair conduct on each half cycle of AC power voltage.

5. A power distribution system according to claim 4 wherein said semiconductor switch devices are comprised of transistors and said unidirectional current conducting semiconductor devices are comprised of diodes.

6. A power distribution system according to claim 4 wherein the unidirectional current conducting semiconductor devices comprise intrinsic devices that form part of the semiconductor switch devices.

7. A power distribution system according to claim 4 and additionally including a snubber connected across both pairs of semiconductor switch devices.

8. A power distribution system according to claim 4 and additionally including a control circuit for generating a control signal coupled to the control terminals of one pair of said series connected semiconductor switch devices for exclusively rendering said one pair of switch devices conductive in absence of a fault and for generating a control signal coupled to the control terminals of the other pair of semiconductor switch devices for exclusively rendering said other pair of switch devices conductive in the event of a fault.

9. A power distribution system according to claim 5 wherein said transistors are comprised of bipolar junction transistors.

10. A power distribution system according to claim 9 wherein said bipolar transistors comprise insulated gate bipolar transistors (IGBTs).

11. A power distribution system according to claim 5 wherein said transistors are comprised of field effect transistors.

12. A power distribution system according to claim 11 wherein said field effect transistors comprise metal oxide semiconductor field effect transistors.

13. A power distribution system according to claim 8 wherein said first and second source of AC power includes a respective static frequency changer for changing the frequency of AC power from an input frequency to a use frequency.

14. A power distribution system according to claim 13 wherein the input frequency comprises 60 Hz and the use frequency comprises 400 Hz.

15. A power distribution system according to claim 8 and additionally including a first circuit breaker connected in respective power lines between the first and second source of AC power and said switch circuit and a second circuit breaker connected between a load and the one pair of semiconductor switch devices which is currently conductive.

16. A power distribution system according to claim 15 and additionally including a common power line connected to said second circuit breaker from both pair s of semiconductor switch devices.

17. A power distribution system according to claim 15 and additionally including a sensor in the power line between the first source of AC power and said switch circuit generating one or more signals coupled to said control circuit and which is responsive to said signals for generating a fault detection signal causing said one pair of semiconductor switch devices to become non-conductive while causing said other pair of semiconductor switch devices to become conductive.

18. A power distribution system according to claim 17 wherein said one or more signals comprise current and voltage signals.

19. A power distribution system according to claim 17 and additionally including a sensor in said common power line generating one or more signals coupled to said control circuit and which is responsive to said signals for generating a fault detection signal causing said one pair of semiconductor switch devices to become non-conductive while causing said other pair of semiconductor switch devices to become conductive.

20. A power distribution system according to claim 15 wherein said first circuit breaker is installed on a switchboard having a plurality of circuit breakers installed thereon, said switchboard being connected to said first source of AC power.

21. A power distribution system according to claim 15 wherein said second circuit breaker is installed on a power panel having a plurality of circuit breakers installed thereon.

22. A power distribution system according to claim 15 wherein said first circuit breaker is installed on a switchboard having a plurality of circuit breakers installed thereon, said switchboard being connected to said first source of AC power;
   wherein said second circuit breaker is installed on a power panel having a plurality of circuit breakers installed thereon;
   and additionally including at least one current and voltage sensor in the power line between the first source of AC power and said switch circuit for generating signals coupled to said control circuit which generates a fault signal for rendering said one pair of semiconductor switch devices non-conductive while rendering said other pair of semiconductor switch devices conductive; and
   a current and voltage sensor located in said common power line for also generating signals coupled to said control circuit which generates a fault signal for rendering said one pair of semiconductor switch devices non-conductive while rendering said other pair of semiconductor switch devices conductive.

23. A power distribution system to claim 22 and additionally including a second current and voltage sensor located in the power line between the second source of AC power and said switch circuit for generating signals coupled to said control circuit which generates a fault signal for rendering said one pair of semiconductor switch devices non-conductive while rendering said other pair of semiconductor switch devices conductive.

24. A power distribution system according to claim 22 wherein said first and second source of AC power include a static frequency changer.

25. A power distribution system according to claim 15 wherein said first circuit breaker is installed on a switchboard having a plurality of circuit breakers installed thereon, said switchboard being connected to said first source of AC power;
   wherein said second circuit breaker is installed on a power panel having a plurality of circuit breakers installed thereon;
   and additionally including a first and a second current and voltage sensor located in the respective power lines between the first source and the second source of AC power and said switch circuit for generating signals coupled to said control circuit which generates a fault signal for rendering said one pair of semiconductor switch devices non-conductive while rendering said other pair of semiconductor switch devices conductive; and
   a current and voltage sensor located in said common power line for also generating signals coupled to said control circuit which generates a fault signal for rendering said one pair of semiconductor switch devices non-conductive while rendering said other pair of semiconductor switch devices conductive.

26. A redundant electric power distribution system for reliably providing power to one or more loads in the event of a line fault, comprising:
   a first and a second source of AC power including a respective frequency changer for supplying power to at least one AC load, the first source being a normally used source and the second source being an alternately used source;
   a fight-through bus transfer switch circuit consisting of at least two pairs of back-to-back series connected semiconductor switch devices, each being shunted by a semiconductor diode and poled so as to be conductive during an alternate half cycle of the AC power, one of said pair of switch devices connecting the first source of AC power to the load in absence of a power fault, and the other of said pair of switch devices connecting the second source of AC power to the load in the event of a power fault.

27. A power distribution system according to claim 26 wherein each of said semiconductor switch devices include a current control terminal and first and second current conducting terminals, and wherein the current conducting terminals of each said pair of semiconductor switch devices are connected in series and the current control terminals thereof are connected in parallel.

28. A power distribution system according to claim 27 and additionally including a control circuit for generating a control signal coupled to the control terminals of one pair of said series connected semiconductor switch devices for exclusively rendering said one pair of switch devices conductive in absence of a power fault and for generating a control signal coupled to the control terminals of the other pair of semiconductor switch devices for exclusively rendering said other pair of switch devices conductive in the event of a power fault.

29. A power distribution system according to claim 26 and additionally including a snubber connected across both pairs of semiconductor switch devices.

30. A power distribution system according to claim 28 wherein said semiconductor switch devices are comprised of transistors.

31. A power distribution system according to claim 30 wherein said transistors are comprised of bipolar junction transistors or field effect transistors.

32. A power distribution system according to claim 31 wherein said bipolar transistors comprise insulated gate bipolar transistors (IGBTs).

33. A power distribution system according to claim 32 wherein the insulated gate bipolar transistor includes shunt diodes that are intrinsic to the devices.

34. A power distribution system according to claim 31 wherein said field effect transistors are comprised of metal oxide semiconductor field effect transistors.

35. A bus transfer switch circuit for connecting a first or a second source of AC power to at least one AC load, the first source being a normally used source and the second source being an alternately used source, comprising:
   two pairs of back-to-back series connected semiconductor witch devices, each being shunted by a semiconductor diode and poled so as to be conductive during alternate half cycles of the AC power, one of said pair of switch devices being operable to connect the first source of AC power to the load, and the other of said pair of switch devices being operable to connect the second source of AC power to the load.

36. A bus transfer switch according to claim 35 wherein each of said semiconductor switch devices include a current control terminal and first and second current conducting terminals, and wherein the current conducting terminals of each said pair of semiconductor switch devices are connected in series and the current control terminals thereof are connected in parallel.

37. A bus transfer switch circuit according to claim 36 wherein said semiconductor switch devices are comprised of transistors.

38. A bus transfer switch circuit according to claim 37 wherein said transistors are comprised of bipolar junction transistors or field effect transistors.

39. A bus transfer switch circuit according to claim 38 wherein said bipolar transistors comprise insulated gate bipolar transistors (IGBTs) and wherein said semiconductor diodes shunting the semiconductor switch devices are intrinsic with the transistors so as to form a common device.

40. A bus transfer switch circuit according to claim 38 wherein said field effect transistors are comprised of metal oxide semiconductor field effect transistors.

* * * * *